United States Patent

Couenne et al.

[11] Patent Number: 5,902,486
[45] Date of Patent: May 11, 1999

[54] METHOD FOR CONTROLLING WITH PRECISION A PROCESS FOR SEPARATING CONSTITUENTS OF A MIXTURE, IN A SIMULATED MOVING BED SEPARATION SYSTEM

[75] Inventors: Nicolas Couenne, Lyon; Pascal Duchene, Vienne; Gérard Hotier, Vernaison; Dominique Humeau, Vienne, all of France

[73] Assignee: Institut Francais du Petrole, Rueil-Malmaison, France

[21] Appl. No.: 09/066,561

[22] Filed: Apr. 27, 1998

[30] Foreign Application Priority Data

Apr. 30, 1997 [FR] France ................................. 97 05485

[51] Int. Cl.$^6$ ....................................................... B01D 15/08
[52] U.S. Cl. ...................... 210/659; 210/662; 210/198.2; 585/821
[58] Field of Search ...................... 210/656, 659, 210/662, 672, 198.2, 264; 585/821

[56] References Cited

U.S. PATENT DOCUMENTS

| 5,387,347 | 2/1995 | Rothchild ................................. 210/659 |
| 5,470,482 | 11/1995 | Holt ........................................ 210/662 |
| 5,762,806 | 6/1998 | Hotier ...................................... 210/659 |

FOREIGN PATENT DOCUMENTS

| 0679421 | 2/1995 | European Pat. Off. ................ 210/659 |
| 9309860 | 5/1993 | WIPO ..................................... 210/659 |

OTHER PUBLICATIONS

"Models for the Separation of Glucose/Fructose Mixture Using a Simulated Moving Bed Adsorber" by Kenji Hashimoto et al, appearing in *2344 Journal of Chemical Engineering of Japan 16*, (1983) Oct. No. 5, Tokyo, Japan (pp. 400–406).

*Primary Examiner*—Ernest G. Therkorn
*Attorney, Agent, or Firm*—Antonelli, Terry, Stout & Kraus, LLP

[57] ABSTRACT

Method for controlling with precision a permanent in-line process for separating constituents of a mixture in a simulated moving bed separation system from concentration and flow rate measurements.

The system comprises a set of columns forming a closed loop comprising several zones between fluid injection and draw-off points. Control of the process (linear or nonlinear) is performed from a knowledge model and from a certain number of operating variables at a plurality of measuring points along the loop (concentrations and flow rates for example) and characteristic measurements of the fluids injected and drawn off. Ratios respectively indicative of the ratio, in each of the different zones, between the fluid flow rates and the simulated adsorbent material flow rates, are determined from actual values of controlled variables depending on the measured operating variables (purity of the constituents, system yield, etc.). Values to be given to the operating variables in order to bring or to bring back the controlled variables to predetermined set values are determined from these ratios. The method can be applied for stabilizing separation processes, notably for aromatic hydrocarbons, in the presence of notable feedstock flow rate or quality variations.

15 Claims, 6 Drawing Sheets

METHOD FOR CONTROLLING WITH PRECISION A PROCESS FOR SEPARATING CONSTITUENTS OF A MIXTURE, IN A SIMULATED MOVING BED SEPARATION SYSTEM

FIELD OF THE INVENTION

The present invention relates to a method for controlling with precision a process for separating constituents of a mixture, in a simulated moving bed separation system, from discrete concentration and flow rate measurements. The method notably applies to the separation of aromatic hydrocarbons.

BACKGROUND OF THE INVENTION

In industry, there are many continuous separation processes based on selective adsorption of at least one component among several in a mixture of fluids, notably processes known as simulated countercurrent chromatography processes where the property of certain porous solids, in the presence of liquid, gaseous or supercritical mixtures, of retaining more or less significantly the various constituents of the mixture is used.

Separation or fractionation processes based on chromatography are most often implemented in a device comprising a set of columns or column fractions interconnected in series, forming a closed loop. Injection points for the mixture to be separated and the solvent or desorbent, and fluid extraction points: extract and raffinate, delimiting different zones are distributed along this loop. Identical liquid flows run through all the columns or column fractions of the same zone.

The devices most often consist of four main zones. However, some have only three zones (in this case, the zone contained between the raffinate draw-off point and the solvent injection point is omitted). There are also devices with five zones where part of the extract separated from the solvent is reinjected between the extract draw-off point and the feedstock injection point. Others may comprise five to seven zones where secondary fluids allow to flush lines carrying successively several fluids, so as to prevent contamination.

A porous solid of determined grain size forms the stationary phase. The mixture to be separated is fed into the column, then displaced by a carrier fluid or desorbent, and the various constituents flow out successively according to whether they are retained more or less significantly by the stationary phase.

In a real countercurrent process (FIG. 1), a fixed and constant concentration profile develops in a separation column 1 where the position of the points of injection of a feedstock A+B, of an eluent S, and of draw-off of an extract EA and of a raffinate RB remains fixed. The adsorbent solid 3 and the liquid 2 circulate in a countercurrent flow. A solid carrying system and a recycling pump P, both placed on the location of the column (at the junction of zones I and IV) where the only species present in the liquid as well as in the solid is the elution carrier fluid, allow respectively to run the solid from the bottom to the top and conversely the liquid from the top to the bottom.

Processes known as simulated moving bed processes allow to avoid a major difficulty inherent in real moving bed processes, which consists in correctly circulating the solid phase without creating attrition and without considerably increasing the bed porosity in relation to that of a fixed bed.

In order to simulate the displacement thereof, the solid is placed in a certain number n of fixed beds (generally $4 \leq n \leq 24$) placed in series and it is the concentration profile which is displaced at a substantially uniform speed all around a closed loop.

In practice, successive shifting of the injection and draw-off points is performed by means of a rotary valve or more simply by means of a set of properly controlled on-off valves. This circular shift, performed at each period, of the various incoming-outgoing flows in a given direction amounts to simulating a displacement of the solid adsorbent in the opposite direction.

Countercurrent or cocurrent simulated moving bed chromatography processes are for example described in U.S. Pat. No. 2,985,589 or U.S. Pat. No. 4,402,832.

A system for separating, in the presence of at least one eluent, a feedstock comprising at least two constituents into at least two fractions generally comprises n closed-loop chromatographic columns or column sections mounted in series (generally $4 \leq n \leq 24$) where a pressurized liquid, supercritical or gaseous mixture is circulated, the loop comprising at least one feedstock injection current, at least one eluent injection current, at least one extract draw-off current and at least one raffinate draw-off current, the constituent preferably sought being mainly either in the extract or in the raffinate.

The main inlet flow rates are the feedstock flow rate and the eluent flow rate. The outlet flow rate is the extract flow rate. The raffinate is withdrawn under pressure control. The raffinate flow rate is equal to the sum of the inlet flow rates minus the extract flow rate. In addition to these controlled flow rates there is a controlled recycle flow rate whose value also depends on the position of the pump at a given time. The relative location of each of the four flows around the beds is calculated so as to obtain a satisfactory behaviour depending on the type of separation to be performed and thus defines four distinct zones in the case of the process shown in FIG. 1.

U.S. Pat. Nos. 5,457,260 and 5,470,482 describe a process controlling a simulated moving bed system for separating a mixture of constituents, comprising two loop interconnected multiple-bed columns, where at least one characteristic such as the purity of a constituent or the yield thereof or a combination of both is controlled. The process comprises measuring the concentration of the various constituents of the mixture circulating in the interconnection circuits of the columns, notably by near-infrared spectroscopy, and using an iterative adjustment algorithm of multivariable regression type or of neural network type which tends to decrease the difference between the actual value of the characteristic and a set value up to a certain threshold. The algorithm used is of the "black box" type with all the drawbacks linked with this type of approach: a considerable implementation time since the result is obtained only after many tests, it is exploitable only in the field of the tests carried out and it is obtained with very little precision, that of the modeling of nonlinearities in general.

In the text hereafter, the following terms designate:

controlled variables: variables which must be constantly close to a precedingly specified set value and which show the smooth running of the process. It may be, for example, the purity of the constituents of an extract, the yield of the separation unit for a given constituent, etc.:

operating variables: variables which can be modified by the operator, such as flow rates or valve switching periods allowing to simulate the displacement of the beds, etc.;

control variables: variables which mainly act on a single zone, for example on the part of the concentration profile contained in a zone. These control variables are determined by the control algorithm and are translated into operating variables.

It may be reminded that the aim of an advanced process intended for control of the running of a separation loop is to calculate a control law (all of the values of the operating variables in the course of time) in order to:

control operation, i.e. to calculate a control law capable of making the transition between two distinct values of one or more controlled variables selected a priori, and regulate operation, i.e. to calculate a control law capable of compensating as much as possible (in advance or at least asymptotically) for all the external disturbances acting on the process so that the controlled variables selected a priori keep a quasi-constant value.

In the case of a simulated moving bed unit, regulation can also compensate for disturbances due to an evolution in time of the thermodynamic and geometric parameters of the adsorbent (of course for a limited deterioration of the properties of the adsorbent).

These objectives are fulfilled with the process intended for automatic control of a process for separating constituents of a mixture of circulating fluids according to the invention, which allows to overcome the aforementioned drawbacks. It is not based on a "black box" type technique but on a more controlled approach permitted by a nonlinear modeling of the separation process.

SUMMARY OF THE INVENTION

The process according to the invention applies to the control of a simulated moving bed system (or unit) for separating constituents, comprising a closed loop consisting of the interconnection in series of beds containing an adsorbent solid material, distributed into several zones delimited by fluid injection and extraction points, means for injecting fluids into the loop, means for extracting fluids from the loop, injection point and extraction point permutation means, allowing to simulate countercurrent displacement of the beds, and means for measuring various variables (such as concentrations, flow rates, the valve permutation period, etc). It comprises:

measuring operating variables and concentrations of certain constituents necessary for calculation of controlled variables in a number of points of the separation loop at least equal to two;

determining, from actual values of measured variables and by using a determined model of the working of the separation system (either a non linear model, or a linear model near a given running point), ratios (Rk) indicative respectively of the ratio, in each of the various zones, between the fluid flow rates ($Q_K$) and the simulated adsorbent material flow rates ($Q_S$) so as to bring or to bring back the controlled variables to determined set values, and determining, from these ratios (Rk), values to be given to the operating variables.

On a section of the separation loop comprising an array of contiguous stages including n zones, where n ratios (Rk) are defined, the process generally comprises defining m controlled variables ($\xi$) depending on flow rate (D) and concentration (X) values, with m less than or equal to n, measuring (only in the case of a non linear control model) concentrations (X) in the liquid phase at the extreme points of the section, and determining m said ratios (Rk) or m combinations of said ratios comprising (n-m) parameters.

According to an embodiment, with a separation loop comprising four main zones, several controlled variables ($\xi$) such as the loop efficiency and the purity of at least one constituent of the mixture are simultaneously controlled from in-line measurements of different concentrations.

A Raman type in-line analysis, chromatographic analysis or near-infrared (NIR) analysis is for example used for concentration measurements.

According to an embodiment, in the case of a separation unit or system with four zones, at least one of the following four quantities is selected as a controlled variable: the purity of a first constituent in a fluid extracted from the loop, the yield of the separation system for a constituent (the same as the first constituent or another one), a trail of said first constituent at the back of a first one of the four zones in relation to the direction of circulation of the fluids, and/or the trail of all of the constituents except for said first constituent at the front of a last of said four zones in relation to the direction of circulation of the fluids.

The method allows, knowing the values of ratios (Rk) in a separation system including a certain number p of zones, to determine the corresponding values of additional ratios resulting from introduction in the separation loop of at least one additional injection point and/or at least one draw-off point, depending on the known value of the ratio in an adjacent section and on the considered injection and/or drawing-off flowrate.

The value of a ratio between concentrations of constituents in a drawn-off fluid can be selected as a controlled variable.

An algorithm of optimisation for the following through of orders fixed for controlled variables can be favorably used.

The method presented can be readily used to control as many controlled variables ($\xi$) as there are ratios (Rk). These controlled variables may be, for example, productivity, solvent proportion, trail measurements, etc.

The method according to the invention allows to maintain a stable running of the separation unit even in the presence of flow rate or feedstock quality variations.

BRIEF DESCRIPTION OF THE DRAWINGS

Other features and advantages of the method according to the invention will be clear from reacting the description hereafter of a non limitative embodiment example, with reference to the accompanying drawings wherein.

DETAILED DESCRIPTION OF THE INVENTION

Figure 1:
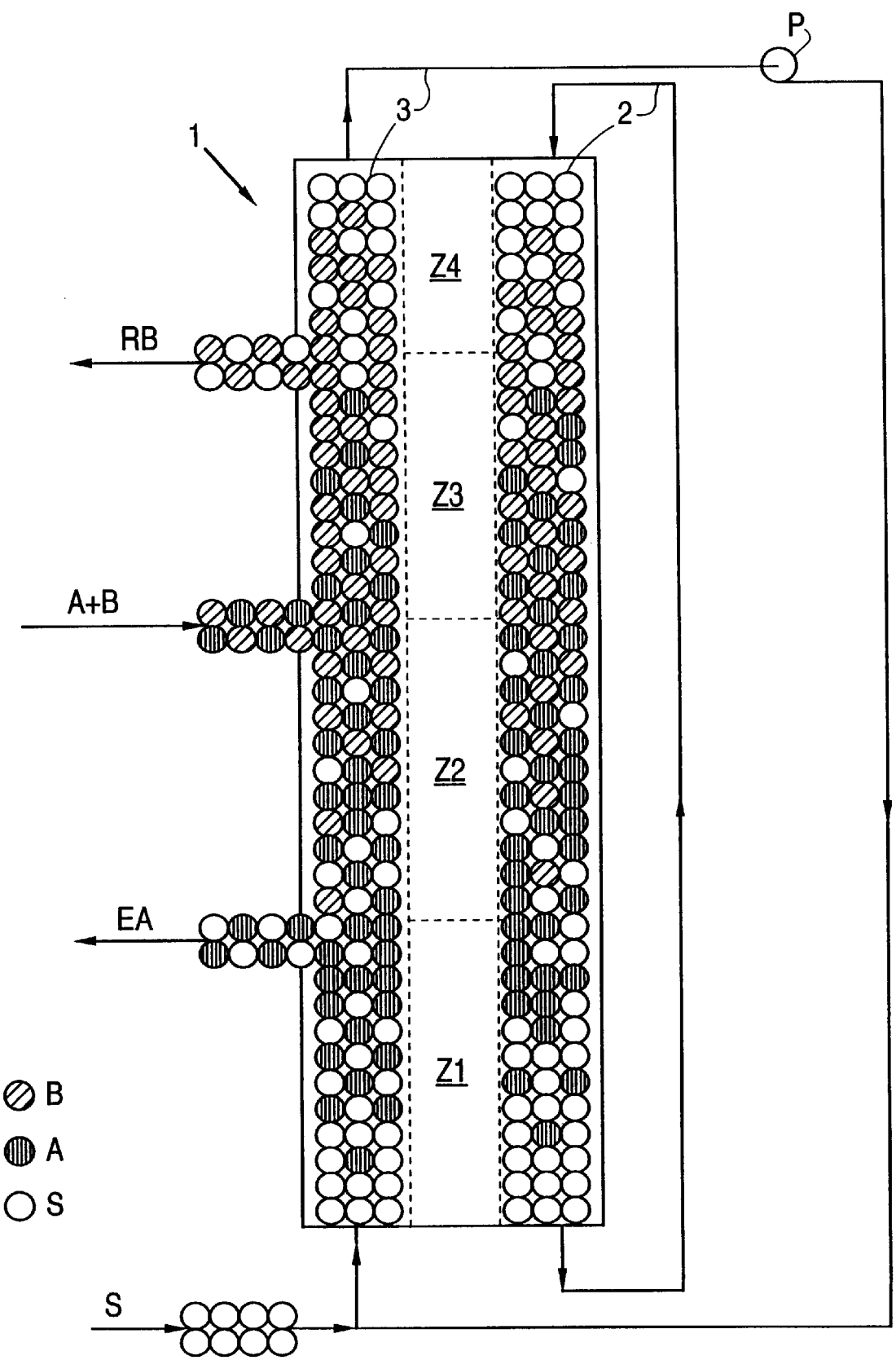
FIG. 1 is a flowsheet of a real moving bed separation loop.

A separation unit comprising a closed separation loop with simulated moving beds is divided into at least four zones, each zone being separated from the next one by an injection or draw-off current, the injection and draw-off currents being permuted at substantially constant time intervals. The loop contains a pump for recycling said mixture, whose output is controlled and which is placed between two successive columns or column sections and possibly at least one means for measuring the concentrations of the liquid phase, also placed between two consecutive columns or column sections.

A Raman type measuring device such as that described in patent FR-2,699,917 (U.S. Pat. No. 5,569,808) filed by the applicant, which gives access to a great number of real-time concentration measurements and thus allows to obtain the concentration profile at various points along the loop, can be advantageously used. Selecting freely n measurements (n generally ranging between two and eight for a separation system with four zones) judiciously distributed in the various zones is then sufficient to ensure smooth running of the algorithm controlling the process.

I) Selection of the Variables a) Controlled variables

The controlled variables are defined as functions $\xi$ of several variables:

$$\xi = F(D,X), \text{ where} \qquad (1)$$

X is a vector representing the concentrations of the various constituents in the liquid phase at different points (this value can be either instantaneous, or an average of the values taken in a permutation period), D is a vector each element of which is an internal injection or draw-off flow rate.

The purity $\xi$ of a constituent in the liquid phase at any point of the unit (in an outgoing flow for example) can be mentioned as an example of controlled variable:

$$\xi = x_i/(x_i + Imp_i), \text{ where}$$

$x_i$ is the concentration of the constituent i at a given point, $Imp_i$ is the sum of the concentrations of the other constituents considered as impurities at this point (which can exclude some constituents such as the eluent for example).

Calculation of this controlled variable at a given time thus implies measurement of t all the concentrations present in the liquid phase at one or more points of the loop. These measurements can for example be performed as mentioned above by Raman type analysis or by any other process.

The controlled variables can a priori be selected freely. In the case of a four-zone unit, the quantities which the operator is used to seeking most often can for example be selected as controlled variables:

1) the purity of one of the constituents in the extract,
2) the yield of the unit for this constituent,
3) the trail, at the back (in relation to the direction of circulation of the fluids) of zone 1, of the constituent considered in points 1) and 2).
4) the trail, at the front (in relation to the direction of circulation of the fluids) of zone 4, of all of the constituents except the constituent considered in points 1), 2) or 3).

b) Control variables

The method according to the invention comprises selecting control variables by means of which the values to be given to the operating variables in order to control the evolution of the controlled variables can be directly determined.

Conversion of these control variables into "conventional" operating variables is always possible outside the real physical application constraints linked with the dimensioning of the process and of the equipment, since there is a one-to-one relationship between them, a necessary condition for the separation system to be perfectly controllable.

In cases where all the operating variables are free (i.e. their value can be freely fixed without the physical constraints concerned being reached), the necessary number of independent control variables is equal to the number of zones forming the separation unit.

It is well-known that the operation of a simulated moving bed separation system is quasi-identical to that of a real moving bed system if, for the latter, the flows circulating countercurrent to the main liquid flow are given by the following relations:

$$Qs = (\% \text{ Vmicro} * \text{Vcolumn})/T \qquad (2)$$

Qs is the "solid flow" (corresponding to the effective capacity) equivalent to that generated by the valve permutation in the simulated moving bed unit.

$$qe = (\% \text{ Vmacro} + \% \text{ Vmeso} + \% \text{ Vvi}) * \text{Vcolumn})/T \qquad (3)$$

qe is the "liquid counterflow" equivalent to that generated by the valve permutation. It corresponds to the quantity of liquid contained in the meso- and macropores, as well as in the external porosity or in the grain porosity added to the bed porosity. It is generally referred to as "stopping flow" or carrying flow. It corresponds to the immobilization of a fluid that is not adsorbed in the microporosity of the adsorbent.

In relations (2) and (3).

T is the value of the period of permutation of the valves of the simulated moving bed unit, Vcolumn is the elementary volume of a unit section (volume contained between two successive injection and/or draw-off points, active or not), % Vmicro, % Vmeso, % Vmacro, % Vvi are respectively the percentages of micropore (effective capacity), mesopore, macropore volume, and of the external porosity of the bed.

The presence of a dead volume which does not appear in Equation (3) and which corresponds to the dead volumes between the successive sieve beds is however taken into account through the artifice of a global increase of the various percentages of Equation (3).

The external liquid flows are the same for the two unit types. On the other hand, the internal flows are different between a simulated moving bed and a real moving bed. These flows are related by the following relation:

$$Q_k = F_k + qe$$

where $Q_k$ is the liquid flow running through zone k of the simulated moving bed unit, $F_k$ is the liquid flow running through zone k of the real moving bed unit.

If we take the example of the non-adsorbed tracer that is to be maintained immobile, the necessary flow is Zero for a real moving bed unit, whereas it is equal to the stopping flow qe for a simulated moving bed unit.

In view of these definitions, the independent control variables selected are 4 dimensionless ratios or ratios Rk (k=1, 2, 3 or 4) between the main liquid flows in each of the zones and the solid flow which is constant in the whole unit:

$$R_k = Q_k/Qs. \quad (4)$$

Selection of the 4 ratios Rk for the control follows from the writing of the material balance equations of the model of a real moving bed unit in the steady state on a column portion which is discretized. A discretization performed with three points (j−1, j, j+1), considering the countercurrent fluid flows, is represented hereunder by way of example.

Figure 2:
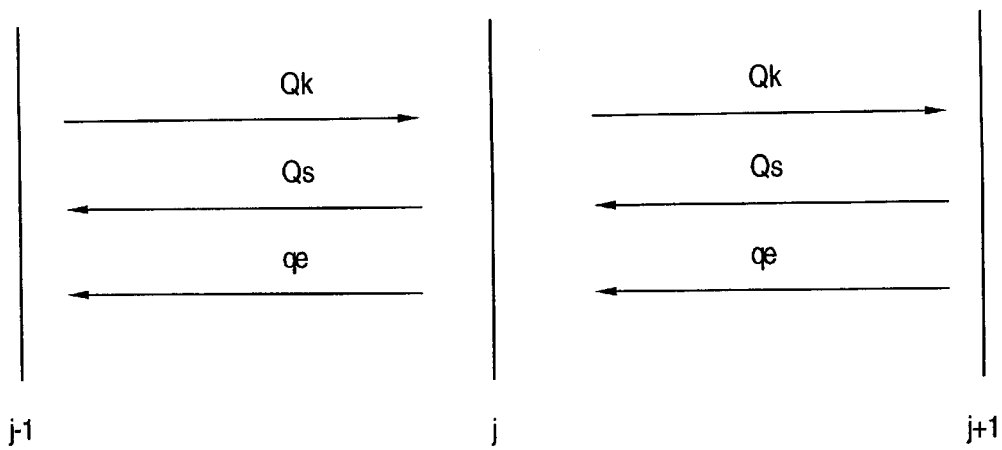
FIG. 2 illustrates the principle of the discretization used for the material balance equations.

By denoting the concentration of constituent i at the point j in the liquid phase by $x_{i,j}$ and the concentration of this constituent at equilibrium in the solid phase at point j by $y_{i,j}$, (FIG. 2) the material balance for this constituent is written as follows:

$$Q_k(x_{i,j-1}-x_{i,j})+Qs(y_{i,j+1}-y_{i,j})+qe(x_{i,j+1}-x_{i,j})=0$$

I.e., by dividing by Qs:

$$(Qk/Qs)(x_{i,j-1}-x_{i,j})+(y_{i,j+1}-y_{i,j})+(qe/Qs)(x_{i,j+1}-x_{i,j})=0 \quad (5)$$

With the respective definitions of Qs and qe, expressed by Relations (1), (2):

$$\frac{qe}{Qs} = \frac{\% V_{meso} + \% V_{macro} + \% V_{vi}}{\% V_{micro}} = K_0 = \text{constant}$$

and Equation (5) is written as follows:

$$Rk(x_{i,j-1}-x_{i,j})+(y_{i,j+1}-y_{i,j})+K_0(x_{i,j+1}-x_{i,j})=0. \quad (7)$$

The only control variable (the freely modifiable parameter of the equation above) is ratio Rk which, considering the definition thereof, is known in each zone forming the unit. There are as many ratios as there are zones. These ratio values can be translated, according to the user or operator's preference, into usual operating variables with the nonsingular algebraic relations relating the values of $Q_k$.

In a 4-zone unit, there is a one-to-one relation between the 4 ratios and 4 of the following 5 operating variables:

T, Q1, Qsolvent, Qextract, Qfeedstock, the 5th variable being a parameter (param) which one decides to fix. It is most often the feedstock flow Qfeedstock. As a result, the following relations relating the ratios to the operating variables are obtained:
if param=Qfeedstock
T=% Vmicro*Vcolumn*(R3−R2)/param
Q1=param*R1/(R3−R2)
Qsolvent=param*(R1−R4)/(R3−R2)
Qextract=param*(R1−R2)/(R3−R2).

This system is defined if param<>0 (which is also equivalent to R3<>R2).

Selecting 4 variables from 5 allows for example to work:
either with a constant or a variable feedstock, but which is imposed by the process,
or with a constant solvent flow,
with constant valve permutation periods, etc.

II) Ratio Calculation Algorithm

1) Non linear model

The calculation algorithm, which allows to calculate the ratios (as defined in paragraph II) so that the controlled variables take values fixed a priori, includes a nonlinear physical model of the real moving bed unit. The calculating method is robust, very fast and implies that enough measurements are available in line.

a) Ratio calculation principle

A number m of controlled variables of the form given by Equation (1), suitably selected by the man skilled in the art, with m less than or equal to n, are set on a section, i.e. a set of contiguous stages including one or more zones where n ratios are defined. By means of the algebraic equations (6) defining the static model and of the available measurements of the concentrations in the liquid phase at the extreme points of the section, these m controlled variables allow to calculate m ratios or m combinations of these ratios comprising (n-m) parameters.

b) Purity calculation example for a 4-zone unit:

The purity $\xi p$ is only defined from the knowledge of the composition of the extract (Xext):

$$\xi p = F(Xext).$$

Figure 3:
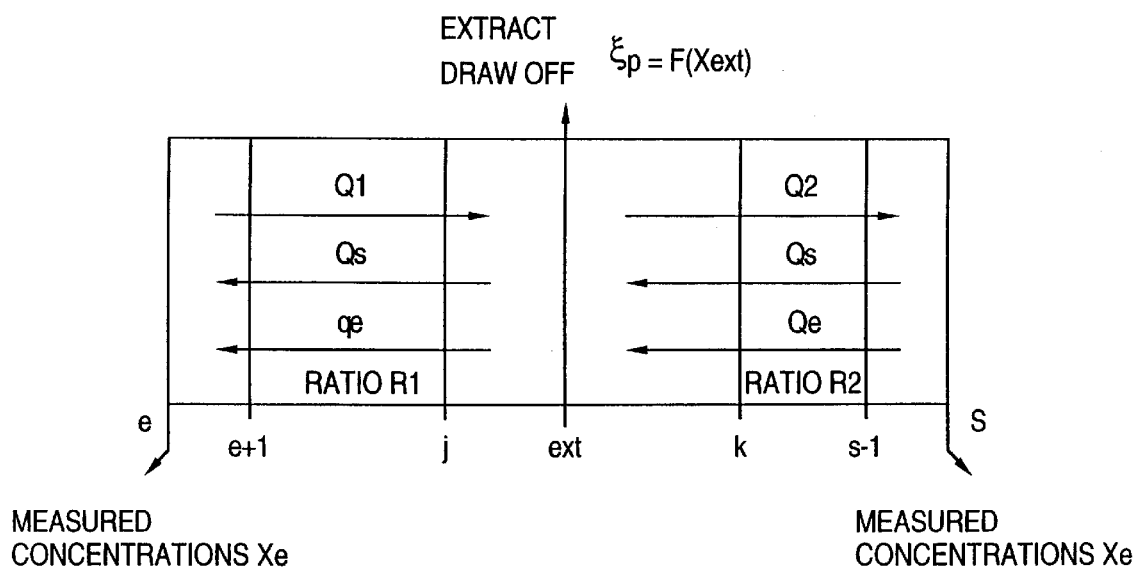
FIG. 3 is a flowsheet of an interzone between two sections of a loop illustrating the ratio calculation.

A section (FIG. 3) consisting of a part of zone 1 and of a part of zone 2, wherein 2 ratios can consequently be defined, is selected. Knowledge of ratio R1 (imposed otherwise), of the concentrations of all the constituents in the liquid phase at the extreme points Xe and Xs and of the set value of purity (controlled variable) allows to calculate ratio R2.

In fact, we can write, from Equation (7) and for a constituent i (exponent $^m$ denoting a really measured value):
on stage e+1:

$$R_1(x^m_{i,e}-x_{i,e+1})+(y_{i,e+2}-y_{i,e+1})+K(x_{i,e+2}-x_{i,e+1})=0$$

on stage j contained between stage e and the extract draw-off stage ext:

$$R_1(x_{i,j-1}-x_{i,j})+(y_{i,j+1}-y_{i,j})+K(x_{i,j+1}-x_{i,j})=0$$

on stage ext corresponding to the extract draw-off:

$$R_1(x_{i,ext-1}-x_{i,ext})+(y_{i,ext+1}-y_{i,ext})+K(x_{i,ext+1}-x_{i,ext})=0$$

on stage k contained between extract draw-off stage ext and stage s−1:

$$R_2(x_{i,k-1}-x_{i,k})+(y_{i,k+1}-y_{i,k})+K(x_{i,k+1}-x_{i,k})=0$$

on stage s−1:

$$R_2(x_{i,s-2}-x_{i,s-1})+(y^m_{i,s}-y_{i,s-1})+K(x^m_{i,s}-x_{i,s-1})=0.$$

c) Existence of a solution

Considering the form of the preceding equations, there is a single solution if the number of equations is equal to the number of unknowns. The unknowns are the concentration values of the constituents present in the liquid phase on each stage plus the ratio in zone 2, i.e.: nc(s−e+1)+1, where nc denotes the number of constituents.

The number of equations is equal to the number of stages contained between e+1 and s+1 multiplied by the number of constituents, i.e.: nc(s−e+1). A complementary equation is given by the value of the desired controlled variable, i.e.: $\xi p - F(Xext) = 0$.

This system of non linear algebraic equations of dimension:

$$[nc(s-e+1)+1]*[nc(s-e+1)+1]$$

is solved by a Newton approximation method. Other output functions such as yield, productivity, trails, can be defined similarly.

Some output functions explicitly depend on the flow rate values imposed on the unit. For example, the constituent 1 yield of the separation unit is defined by:

Yield=100−(Qraf*$x_{1,raf}$)/(Qfeedstock*$x_{1,feedstock}$).

This function can be simply expressed as a function of the ratios:

Yield=100−(R3−R4*$x_{1,raf}$)/(R3−R2$x_{1,feedstock}$).

d) Examples

The simulations presented below relate to a xylene separation unit with simulated moving beds and 4 zones (which does not limit the range of application of the invention in any way). One seeks to purify the paraxylene recovered in the extract. The feedstock contains 5 constituents: paraxylene, metaxylene, orthoxylene, ethylbenzene and paraffins. The two main controlled variables are the paraxylene purity and the paraxylene yield of the separation unit. The values of the controlled variables depend on the position of the separation unit in the aromatics processing loop.

The analysis means must be suited to the output functions to be measured in terms of precision and of response time.

e) Selection of the controlled variables:

1) The purity of the paraxylene in the extract defined by the relation:

$\xi 1=PXe/(PXe+IMPe)$, where

PXe is the average value of the paraxylene concentration in the liquid phase at the extract draw-off point, IMPe is the sum of the concentrations of the other constituents present in the liquid phase at the level of the extract draw-off point apart from the solvent (and possibly the paraffins).

The value of $\xi 1$ mainly depends on the value IMPe because PXe is substantially constant. IMPe mainly depends on the ratio in zone 2 (R2).

2) The paraxylene yield of the unit defined by the relation:

$$\xi_2 = \frac{PX_e Q_{extract}}{PX_c Q_{feedstock} + PX_s Q_{solvent}}$$

or the equivalent thereof in the steady state:

$$\xi_2 = \frac{PX_c Q_{feedstock} + PX_s Q_{solvent} - PX_r Q_{raffinate}}{PX_c Q_{feedstock} + PX_s Q_{solvent}}$$

where PXc, PXs and PXr are respectively the values of the paraxylene concentration in the liquid phase in the feedstock, the solvent and the raffinate.

$Q_{extract}$, $Q_{feedstock}$, $Q_{solvent}$ and $Q_{raffinate}$ are respectively the extract, feedstock, solvent and raffinate flow rates.

The value of $\xi 2$ mainly depends on the value PXr, therefore on the ratio in zone 3 (R3). It also depends on the feedstock, solvent and raffinate flow rate and on the paraxylene composition of the feedstock and of the solvent.

Considering what has been precedingly explained concerning the number of control variables available for a unit comprising four zones, two additional controlled variables must be selected.

3) The paraxylene trail in the liquid phase at the back (in relation to the direction of circulation of the fluids) of zone 1, which can be defined by the relation:

$\xi 3 = PX4$.

The measuring point selected is situated at ¾ the length of zone 4. The value of $\xi 3$ mainly depends on the ratio in zone 1 (R1).

4) The trail of all the constituents except the paraxylene at the front (in relation to the direction of circulation of the fluids) of zone 4, which can be defined by the relation:

$\xi 4 = IMP1$ where IMP1 is the sum of the concentrations of all the constituents present in the liquid phase except paraxylene and the solvent (and possibly paraffins).

The measuring point selected is situated at ¼ the length of zone 1. The value of $\xi 4$ mainly depends on the ratio in zone 4 (R4).

f) Implementation of the control algorithm: control variables or ratios calculation The control principle consists in using the model equations on unit sections. In the case selected, the following three sections are used:

The first section T1 is contained between the middle of zone 4 and the middle of zone 1. It allows simultaneous calculation of the ratios in zone 4 (R4) and zone 1 (R1). This is possible because the controlled variables $\xi 3$ and $\xi 4$ are defined on this section.

The second section T2 is contained between the middle of zone 1 and the middle of zone 2. This section allows to calculate ratio R2, knowing R1. Variable $\xi 2$ is situated in the middle of this section.

The third section T3 is contained between the middle of zone 3 and the middle of zone 4. This section allows to calculate ratio R3, knowing R4. Variable $\xi 3$ is situated in the middle of this section.

Figure 4:
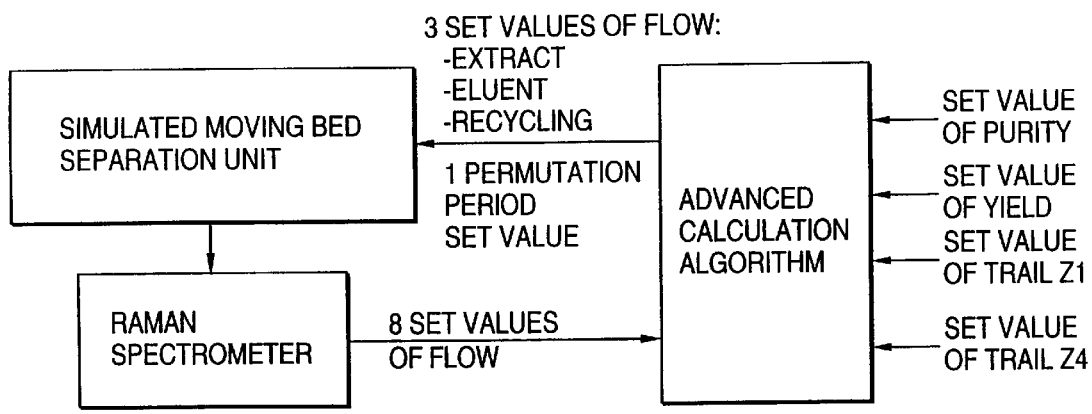
FIG. 4 shows a flowchart of the various phases of the loop control process, FIG. 5 schematizes a separation loop with four zones, four injection or draw-off points and eight measuring points.

From a practical standpoint, it is thereafter advisable to select the operating variables which are actually available in the unit. The following four variables are selected: the extract flow, the recycling flow, the eluent flow and to the valve permutation period T (consequently the feedstock flow is selected by the operator and the raffinate flow is deduced all the time by material balance). The looping of the algorithm on the unit is shown in FIG. 4 for the example considered.

g) Simulation

A simulation has been performed from a knowledge model of the separation unit. Such a model includes thermodynamic type knowledge and kinetic type knowledge. The system thermodynamics is represented by adsorption isotherms. In the case studied here, these isotherms are nonlinear and coupled. It may be a n-constituent generalized Langmuir isotherm (constant adsorption selectivity) or preferably an isotherm with non-constant selectivities such as selectivities with two thresholds connected by a slope, or a n-constituent generalized Langmuir-Freundlich isotherm. The system kinetics is represented by theoretical plates or by a dispersion coefficient specific to each one of the n constituents.

Figure 5:
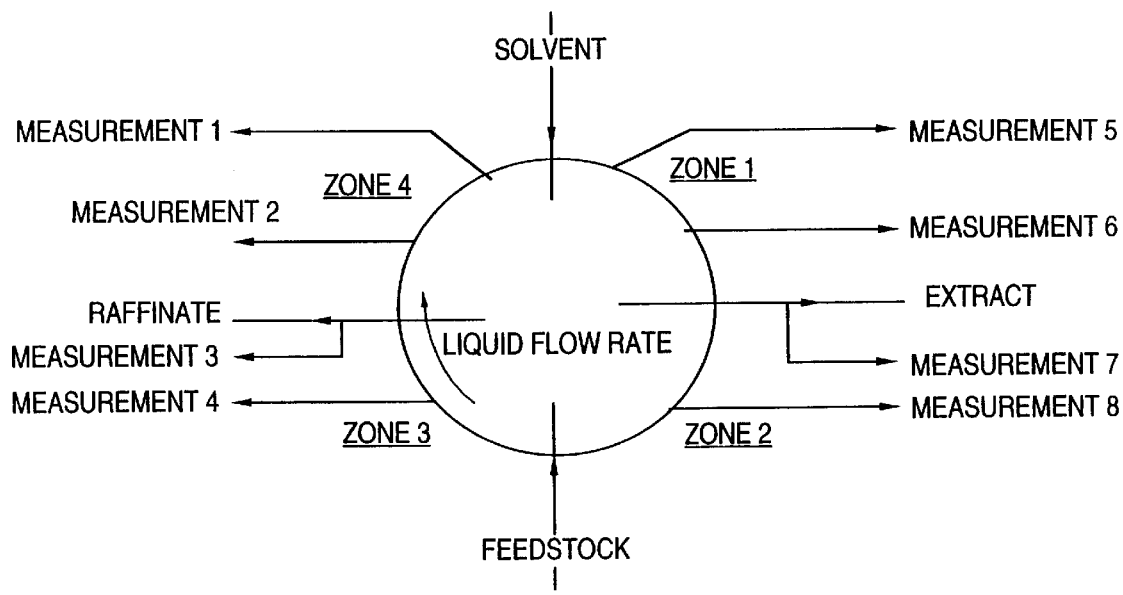

The number of measuring points used is 8, distributed as shown in FIG. 5. The knowledge model used in this case is a Langmuir-Freundlich isotherm associated with a cascade of theoretical plates. The number of measurements and the position thereof depend on the choice of the sections which have been selected as mentioned above. Of course, this selection is here merely illustrative and the invention covers all the section combinations compatible with the required objective(s).

Figure 6:
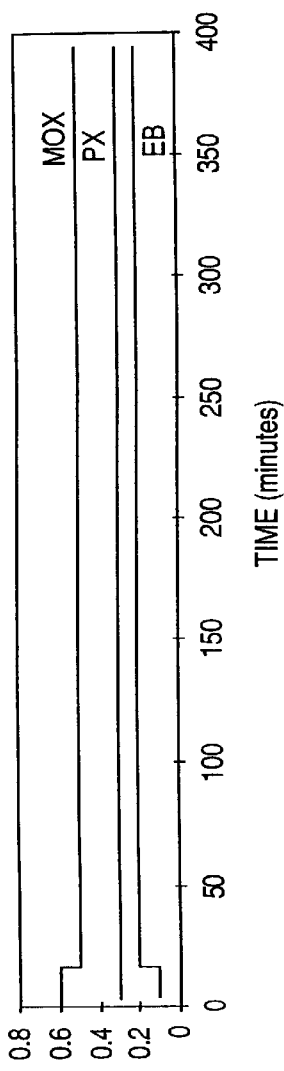
FIG. 6 shows a chronogram of the changes brought to the composition of a feedstock in order to illustrate a regulation example in the following simulations.

The result presented is an example of control. The process functions with constant set values of purity (95%) and yield (95%), whereas the composition of the feedstock is substantially changed. The change in the feedstock quality is produced after ten minutes' stable running (FIG. 6).

One substitutes, for a feedstock whose volume composition is as follows:

Tol=0.022
Px=0.290
MxOx=0.598
EB=0.102
Par=0.032 a feedstock whose volume composition is as follows:
Tol=0.024
Px=0.290
MxOx=0.512
EB=0.190
Par=0.032.

Figure 7:
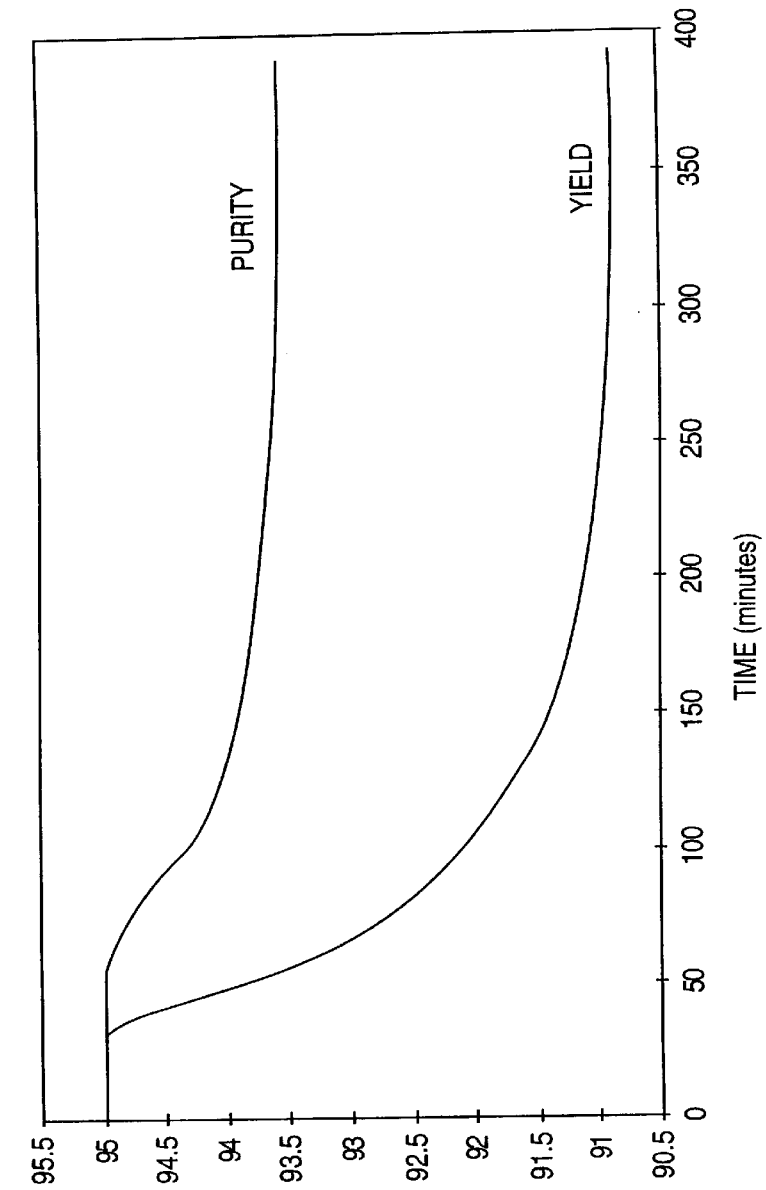
FIG. 7 shows chronograms of the evolution of two controlled variables, i.e. the purity of an extract and the unit yield, as a result of the changes introduced.

The effect of the disturbance described in FIG. 5 is shown in FIG. 7 in the absence of the control algorithm. It is translated into a 1.2% purity decrease and a 4% yield decrease. The process is therefore highly sensitive to this feedstock quality disturbance.

Figure 8:
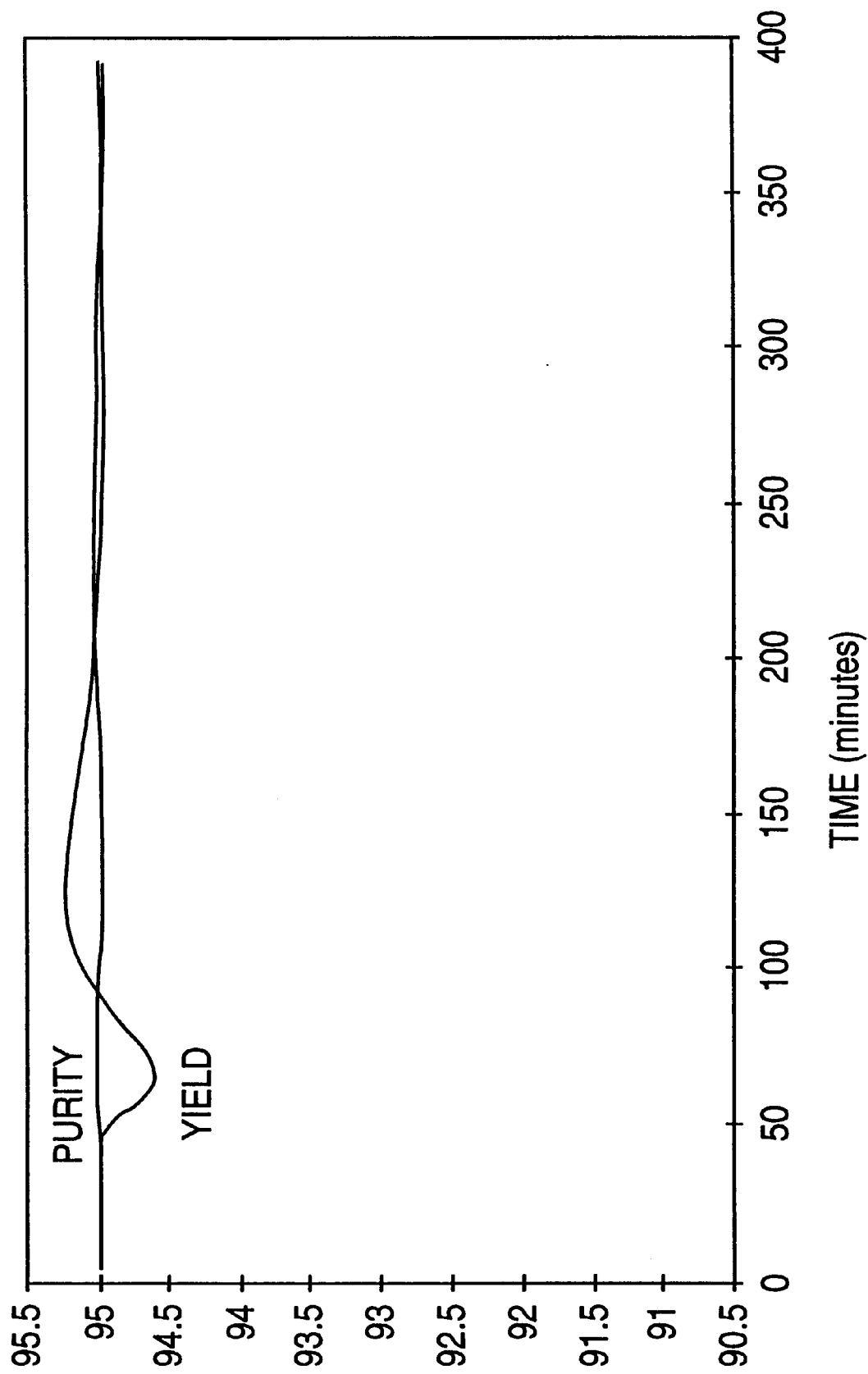
FIG. 8 shows the efficiency of the control provided under the same conditions by applying the process according to the invention.
Figure 9:
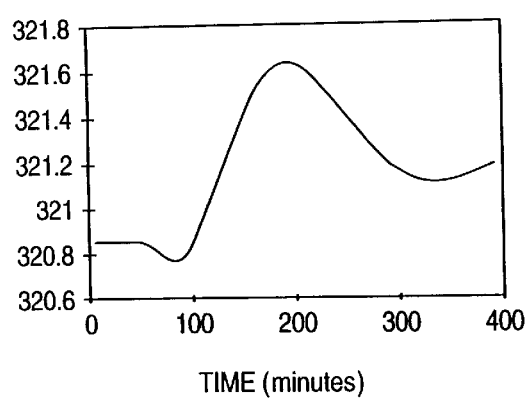
FIGS. 9 to 12 show evolution chronograms relative to four operating variables during the stabilization of the process, respectively the recycle flow rate (FIG. 9), the extract flow rate (FIG. 10), the permutation period (FIG. 11) and the raffinate flow rate (FIG. 12).
Figure 10:
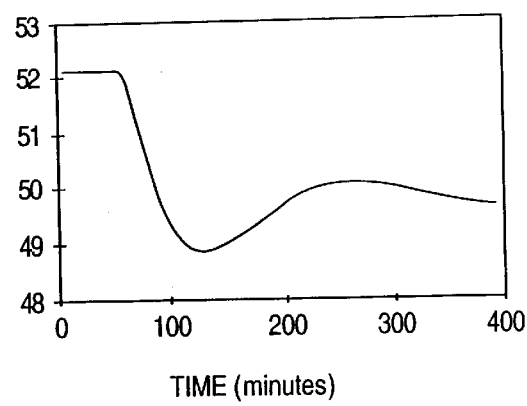
Figure 11:
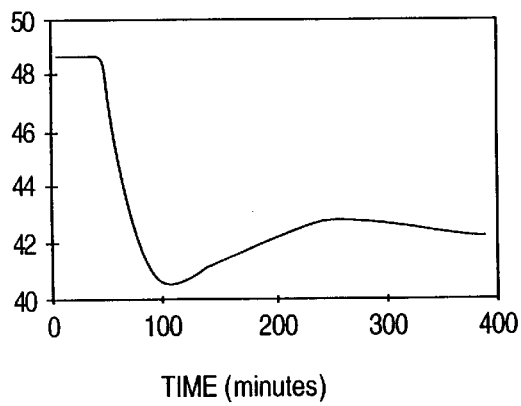
Figure 12:
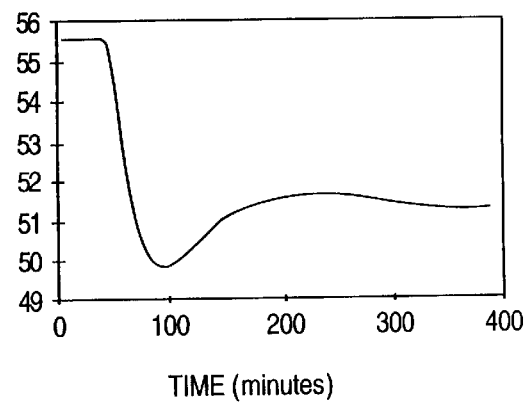

The same disturbance is applied to the process according to the invention (FIG. 8). Stabilization of the process is performed in about 180 minutes, i.e. 3 hours. The purity difference is insignificant. The maximum yield difference is less than 0.45%. It can be noted that the four controls simultaneously evolve (FIGS. 9 to 12) significantly.

In the presence of disturbances, operation of the separation loop is hardly controllable by an operator who must act, as mentioned, on four variables simultaneously. Under such conditions, it will take at best 24 hours and several successive stabilization operations for a highly experienced operator to hope to restabilize the process.

The considerable decrease in the off-specification transient production periods necessary for stabilization, permitted by implementing the process according to the invention, is translated industrially into a correlative productivity increase.

h) Variants:

The algorithm can also be used in association with a numerical simulation model of the process in order to position all of the operating variables.

The aim is here to optimize the running of the unit model in several instances: unit dimensioning, unit start, final optimization close to an already correct solution, use of a pre-existing unit with a different separation problem, etc. Of course, this use can only be viewed with a model close to the physical reality as described in the preceding paragraph. In this case, of course, the adjustment value does not produce exactly the expected performances, they may then be lower or higher than those desired, according to the precision of the simulated model. Looping of the algorithm will then allow to precisely reach the specifications from these approached values.

2) Linear model

According to a second emplementation determination of ratios (Rk) from actual values of measured variables can be performed by using monovariable (representative of the behaviour of an output in relation to the variations of an input) or multivariable (representative of the behaviour of several outputs in relation to several inputs) linear models. Determination of these "simple" models is performed from a set of experimental measurements obtained with the process running in a state close to the expected stable state thereof.

These models are generally only representative close to a stable working point of the system.

A conventional linear control law (of the internal-model control, predictive control type, etc.) can be readily synthesized from these models. The simplicity of the models allows to readily calculate simple and robust control laws compensating in a way for the imprecision of the representation selected. In simulation, the performance tests of the control law thus calculated are equivalent to those obtained with the control law calculated from the non-linear physical model of the process.

III) Implementation Variants

1) Additional injecting points

The use of non-linear and linear controls, as defined above, presented in the instance of a 4-zone unit, can absolutely apply to separation units comprising a greater number of zones generated by adding one or more fluid injection points. In this case, calculation of ratios R1, R2, R3 and R4 remains the same if one considers that the additional injection flow(s) are imposed by the operator (directly or indirectly as a proportion of the feedstock or extract flow for example). The value of the ratio(s) depending on the new injection(s) simply results from the value of the known adjacent ratio and from the value of the injection flow considered.

2) Additional drawing-off points

The use of non-linear and linear controls, as defined in extension No. 1, presented in the instance of a 4-zone unit, can apply to units comprising a greater number of zones generated by adding one or more fluid draw-off points. In this case, calculation of ratios R2 or R3 is generalized to the additional ratios generated by the new withdrawals. An output function therefore has to be defined for each fluid drawn off as a function of the desired specification (purity or yield specification for example). In this case, each added draw-off flow value becomes a new independent operating variable for the process.

If no specification is desired for the additional withdrawal, then the value of the flow is imposed by the operator and we are in the same situation as in extension No. 2.

3) Additional injection and drawing-of points

The use of non-linear and linear controls, as defined above, presented in the instance of a 4-zone unit, can apply to units comprising a greater number of zones generated by adding one or more fluid injection and one or more fluid draw-off points. The arguments described in the two preceding paragraphs then just have to be repeated and globalized.

4) Optional controlled variables

Whatever be the selected control mode either non-linear or linear one of the 4 cited controlled variables: purity of a component, yield of a component (the same as for the purity or another) and value of the trails in zone 1 and in zone 4, can be replaced by a new controllable variable which is the value of the ratio between the compositions of a drawn off fluid. For examples in the extract, one may choose to control both the purity of paraxylene (mainly with R2) and the variable defined by the ratio between the ethylbenzene concentration and the sum of the metaxylene and orthoxylene concentrations. The latter variable will be mainly influenced by ratio R4.

5) Optimisation of the control modes

The non-linear and linear controls as defined above can be interfaced with an optimization algorithm proposing a series of set values for the controlled variables described in extension No. 5, thus allowing to guarantee optimal operation in the sense of a minimization of a function defined by the operation constraints.

We claim:

1. A process for controlling a constituent separation system with simulated moving beds comprising a closed separation loop consisting of the interconnection in series of beds containing an adsorbent solid material, distributed into several zones delimited by fluid injection and draw-off points, means for injecting fluids into the loop, means for extracting fluids from the loop, injection and draw-off point permutation means, allowing to simulate countercurrent displacement of the beds, and means for measuring operating variables, characterized in that it comprises:

measuring, at a plurality of points along the loop, variables characteristic of the fluids injected and drawn off and variables characteristic of the running of the separation system, determining, from actual values of measured variables and by using a nonlinear model of the separation systems, ratios (Rk) indicative respectively of the ratio, in each of the various zones, between fluid flow rates ($Q_k$) and simulated adsorbent material flow rates ($Q_s$), so as to bring or to bring back controlled variables ($\xi$) to determined set values, and determining, from these ratios (Rk), values to be given to the operating variables.

2. A process as claimed in claim 1, characterized in that values to be given to the operating variables are determined using a non-linear model of the separation system.

3. A process as claimed in claim 2, characterized in that it comprises, on a section of said separation loop including an array of contiguous stages comprising n zones where n ratios (Rk) are defined, defining m controlled variables ($\xi$) depending on flow rate values (D) and concentration values (X), m being less than or equal to n, measuring concentrations in the liquid phase at the extreme points of the section and determining m said ratios (Rk) or m combinations of said ratios comprising (n-m) parameters.

4. A process as claimed in claim 1, characterized in that values to be given to the operating variables are determined using a linear model of the separation system near a given running point.

5. A process as claimed in claim 1, characterized in that it comprises, on a section of said separation loop including an array of contiguous stages comprising n zones where n ratios (Rk) are defined, defining m controlled variables ($\xi$) depending on flow rate values (D) and concentration values (X), m being less than or equal to n, and determining m said ratios (Rk) or m combinations of said ratios comprising (n-m) parameters.

6. A process as claimed in claim 1, characterized in that the operating variables are flow rates and the valve switching period (T) allowing displacement or the beds to be simulated.

7. A process as claimed in claim 1, characterized in that the separation loop comprising four main zones, controlled variables ($\xi$) such as the yield of the loop and the purity of at least one constituent of the mixture are simultaneously controlled from in-line measurements of various concentrations.

8. A process as claimed in claim 1, characterized in that it comprises concentration measurements by Raman type in-line analysis or by chromatographic analysis or by near-infrared analysis (NIR).

9. A process as claimed in claim 8, characterized in that the value of a ratio between concentrations of constituents in a drawn-off fluid is selected as a controlled variable.

10. A process as claimed in claim 1, characterized in that, in the case of a separation system with four zones, at least one of the following four quantities is selected as a controlled variable: the purity of a first constituent in a fluid extracted from the loop, the yield of the separation system for a constituent, a trail of said first constituent at the back of a first of the four zones, in relation to the direction of circulation of the fluids, or the trail of all the constituents except said first constituent at the front of a last of said four zones, in relation to the direction of circulation of the fluids.

11. A process as claimed in claim 1, characterized in that a knowledge model based on coupled and nonlinear isotherms such as two-threshold selectivity values or generalized Langmuir-Freundlich isotherms are used for the separation system simulation.

12. A process as claimed in claim 1, characterized in that, the values of ratios (Rk) in a separation loop including a certain number p of zones being known, the corresponding values of additional ratios resulting from introduction or at least one additional injection point in the separation loop is determined as a function of the known value of the ratio in an adjacent zone and the value of the injection flowrate at said additional injection point.

13. A process as claimed in claim 1, characterized in that the values of ratios (Rk) in a separation loop including a certain number p of zones being known, the corresponding values of additional ratios resulting from introduction of at least one additional draw-off point in the separation loop is determined as a function of the known value of the ratio in an adjacent zone and the value of the draw-off flowrate at said additional draw-off point.

14. A process as claimed in claim 1, characterized in that an optimisation algorithm is selected allowing the following through of fixed orders for the controlled variables to be achieved.

15. A process as claimed in claim 1 wherein aromatic hydrocarbons with eight carbon atoms are separated.

* * * * *